Oct. 7, 1941.　　　　C. A. ELLIS　　　　2,257,941
BREATHER RESERVOIR
Filed May 10, 1939　　　　3 Sheets-Sheet 1
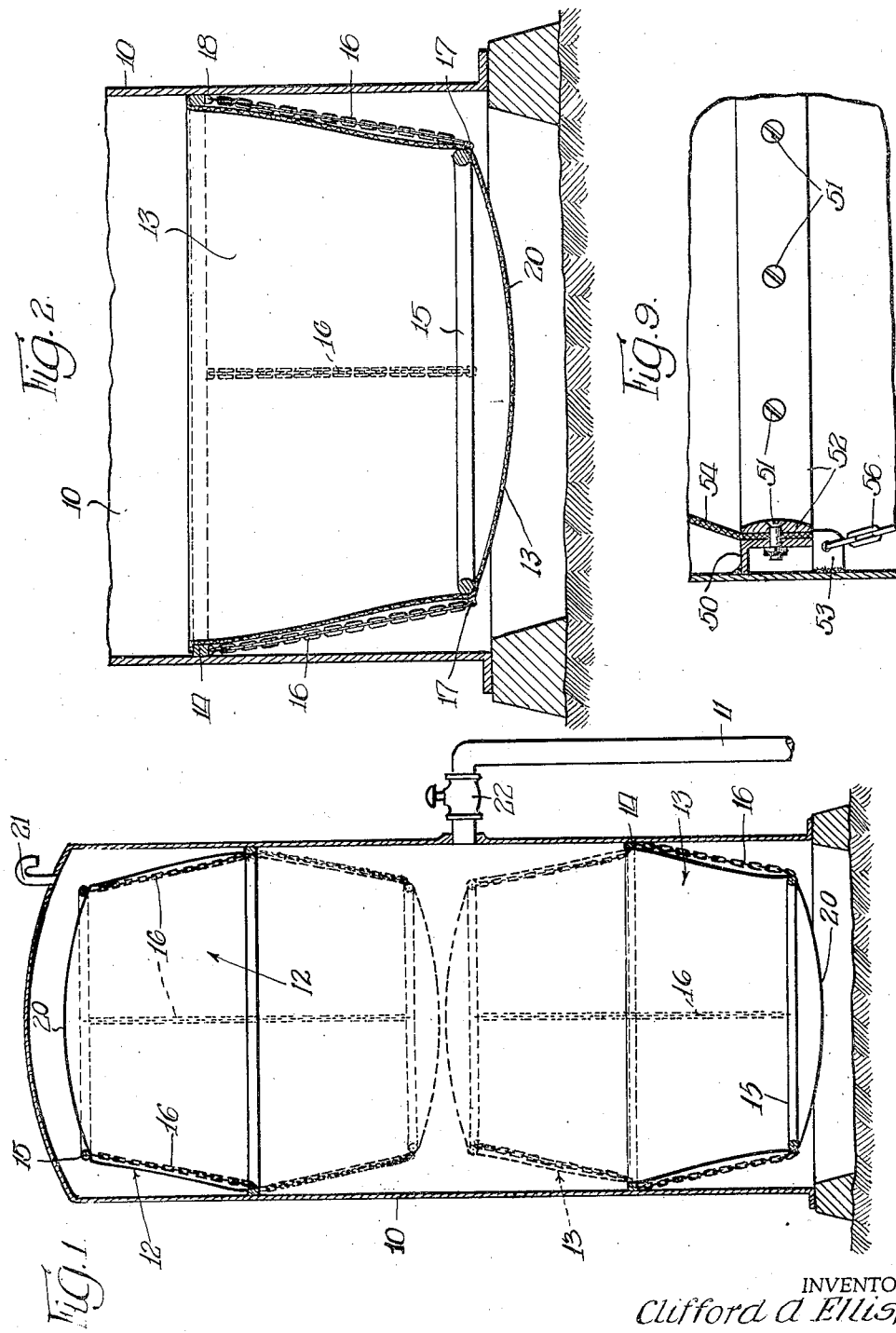
INVENTOR.
Clifford A. Ellis,
BY
ATTORNEYS.

Oct. 7, 1941.                C. A. ELLIS                2,257,941
                          BREATHER RESERVOIR
              Filed May 10, 1939            3 Sheets-Sheet 2
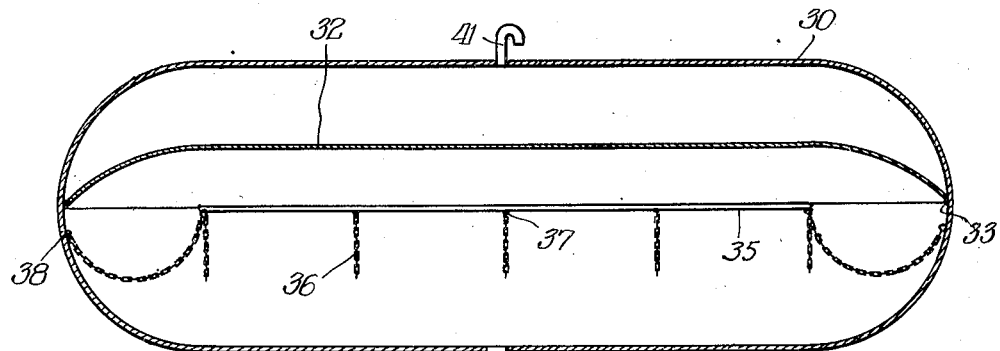
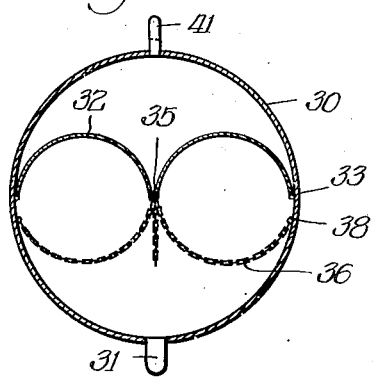
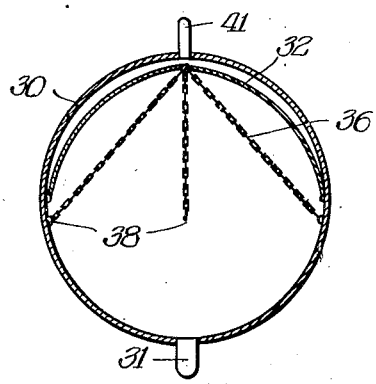
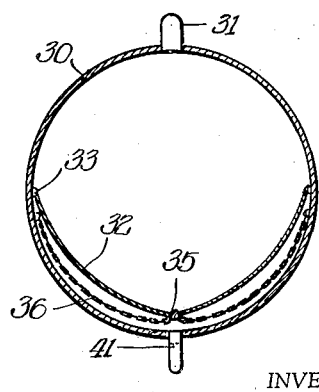
INVENTOR.
Clifford A. Ellis, Oct. 7, 1941.                C. A. ELLIS                2,257,941
                          BREATHER RESERVOIR
                Filed May 10, 1939           3 Sheets-Sheet 3
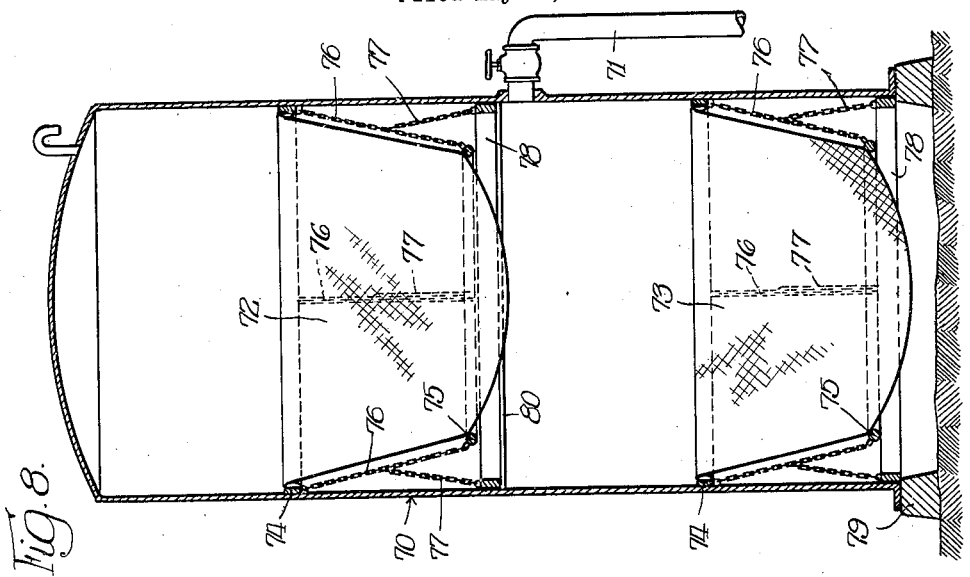
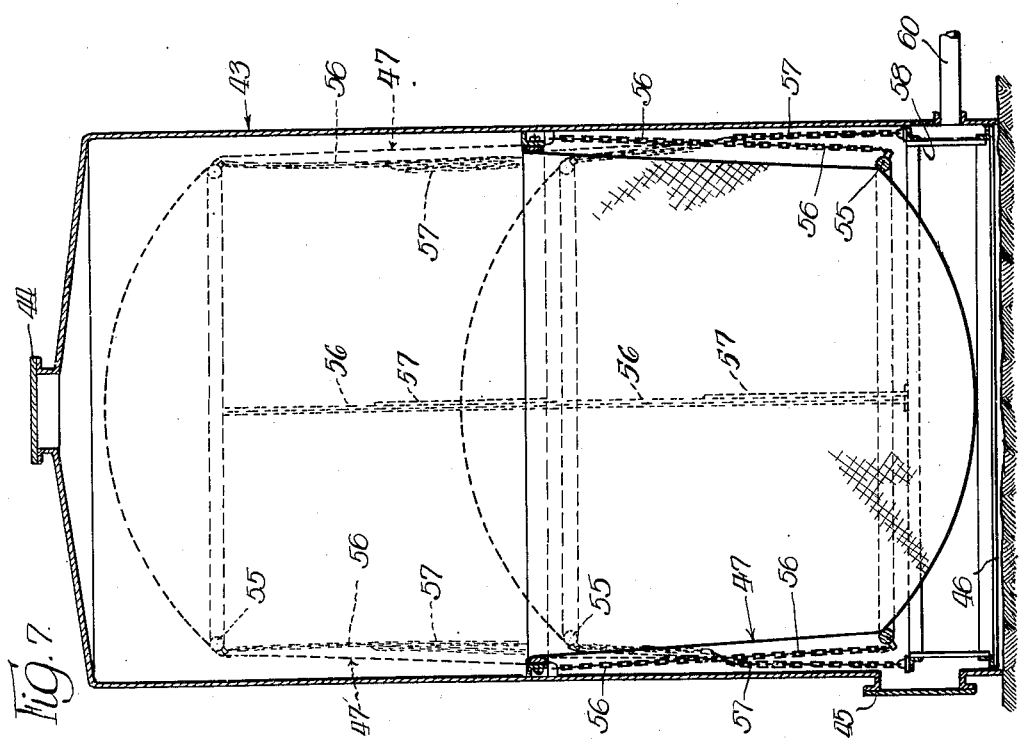
INVENTOR.
Clifford A. Ellis,
BY
　　　　　　　ATTORNEYS.

Patented Oct. 7, 1941

2,257,941

UNITED STATES PATENT OFFICE 2,257,941

BREATHER RESERVOIR

Clifford A. Ellis, Ridgefield, N. J.

Application May 10, 1939, Serial No. 272,841

11 Claims. (Cl. 48—178)

The invention relates to tanks and has more particular reference to a breather reservoir to take care of fluctuations in vapor pressure from one or more storage tanks for gasoline or other volatile liquids.

An object of the invention is to provide an improved breather reservoir of simple construction which can be economically manufactured and which may be housed within a new steel tank built especially for the purpose or within an old tank adaptable to the invention with only slight changes.

Another object of the invention is to provide a breather reservoir of improved construction wherein substantially all the space within the tank or housing for the reservoir will be available to take care of pressure variations from gasoline storage tanks and the like and which will operate under a vacuum and also on pressures above atmospheric.

Another object is to provide a breather reservoir which can be easily adjusted to operate on different pressures and which pressures may vary within relatively wide limits.

Another object is to provide a breather reservoir that can be adjusted to operate on pressures above atmospheric independently of any adjustment for operation on pressures below atmospheric.

Another and more specific object resides in the provision of a double action gas holder which will operate to provide storage space for vapors under pressure discharged from tanks storing volatile liquids, and which will also provide for the opposite condition when the vapors in the storage tanks are cooled and the pressure drops below atmospheric, causing a vacuum, whereupon vapors are withdrawn from the gas holder to equalize the pressure within the tanks.

A further object of the invention is to provide a gas holder of the breather type having at least one diaphragm of flexible material capable of moving vertically to vary the vapor space of the holder and which is balanced by novel means so that the diaphragm is maintained under control during said vertical movement.

Another object resides in the provision of a double action gas holder having an upper and lower diaphragm each equipped with one or more loading members for maintaining the same in substantially horizontal position during movement thereof and which loading members will also serve to limit the movement of their respective diaphragm in an upward and downward direction.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts.

Figure 1 is a vertical sectional view of a double action breather reservoir embodying the features of the invention;

Figure 2 is a fragmentary enlarged view showing the construction of one of the flexible diaphragms of the reservoir;

Figure 3 is a vertical sectional view taken longitudinally through a modified form of breather reservoir comprising a single diaphragm;

Figure 4 is a vertical transverse sectional view taken along line 4—4 of Figure 3;

Figure 5 is a view similar to Figure 4 showing the position the diaphragm assumes when the vapors within reach a relatively high pressure;

Figure 6 is a similar view showing the diaphragm in deflated position;

Figure 7 is a vertical sectional view of a single-acting breather reservoir embodying modified improvements coming within the invention;

Figure 8 is a vertical sectional view showing a double acting breather reservoir equipped with the modified improvements as shown in Figure 7; and Figure 9 is a detail sectional view showing the manner of fastening the fabric of the diaphragm to the securing ring.

Referring to Figures 1 and 2, which illustrate one modification of a double action type of gas reservoir, the steel shell 10 comprising the housing for the reservoir may consist of a new tank built especially for the purpose or said housing may comprise an old tank that has been renovated in order to accommodate the present construction.

The vapor supply line 11 has connection with the tank 10 in the vicinity of its mid-section and vapors from one or more storage tanks are delivered to said tank 10 through the said supply line and conducted therefrom. It is well known that the vapor pressure within storage tanks for gasoline or other volatile liquids increases during the mid-part of the day due to the direct rays of the sun on the tanks and this is especially true in the summer time. During the night the temperature may drop to an extent where a large portion of the vapors are condensed. The vapor pressure within said storage tanks will therefore vary within relatively wide limits and for this reason the storage space of the tanks is generally connected with a breather reservoir which will function to store the vapors when excessive pressures are generated and return said vapors to the tanks when an opposite condition exists.

The breather reservoir of the invention essentially consists of at least one diaphragm suitably located within the tank or housing and positioned so as to divide the interior thereof into compartments. One of the compartments has communication with the supply line 11 so that vapors are supplied to said compartment, whereas, the other compartment is normally vented through some means to the atmosphere.

Referring to the embodiment of the invention shown in Figures 1 and 2, the housing 10 provides a double action gas reservoir since an upper diaphragm 12 and a lower diaphragm 13 are suitably supported within the same. Each diaphragm consists of flexible, gas impervious material secured around its periphery to the securing ring 14, having suitable connection to the interior wall of the housing. The securement of the diaphragm to the housing is such as to effectively prevent leakage of the vapors. The central part of the diaphragm, as better shown in Figure 2, carries a ring 15 of metal or the like which aids in the control of the diaphragm during its up and down movement in addition to providing an anchor for one end of the loading chains 16. The chains are spaced around the circumference of the diaphragm and are suitably fastened at 17 to said ring 15 and at their other end 18 to the securing ring 14. The central portion 20 of each diaphragm, that is, the portion confined within its respective ring 15, assumes a dome position, which is directed downwardly when the diaphragm is deflated and upwardly upon inflation thereof.

The ring 15 carried by each of the diaphragms determines the form the diaphragm assumes when in its lower position and also in its upper position. Said ring and the loading members comprising the chains 16 apply a weight to their respective diaphragm and which, due to the particular arrangement of the chains, is a gradually increasing weight, as the diaphragm moves in an upward direction. The weight applied by the chains 16 is uniformly distributed, provided the ring 15 maintains a horizontal position during movement. However, if the ring should tilt, more weight is automatically placed on the high side which prevents further tilting and has a tendency to level the ring. Accordingly, the ring maintains a substantially horizontal position during up and down movement of this diaphragm. The flexing of the central portion 20 of the diaphragm to a dome shape, upon inflation of the reservoir, also aids in the control of the same during movement. Said portion may consist of the same material as the diaphragm, as shown in Figure 2, or said portion may comprise a limber sheet of metal suitably secured around its periphery to the ring 15. The imperforate member thus defined by the ring 15 functions as the movable element of the reservoir and has a gas-tight connection with the walls of the housing by a cylindrical sealing element comprising the flexible fabric 12, in the case of the upper diaphragm, and the flexible fabric 13, with respect to the lower diaphragm.

It will be noted that the supply line 11 has connection with the mid-section of tank 10 and that one diaphragm is located above said supply line, whereas, the other diaphragm is located below the same. The space defined by said diaphragms and the cylindrical wall of the tank is accordingly adapted to receive the vapors and store the same so as to relieve the dangerous pressures which would otherwise exist within the vapor space of the gasoline storage tanks. When the space within the reservoir is under atmospheric pressure the upper diaphragm 12 will be located in its lower position, shown in dotted lines in Figure 1, and the lower diaphragm 13 will also be located in its lower position, as shown in full lines in said figure. However, assuming the vapors to be under pressure, the upper diaphragm 12 will move upwardly, providing a gradually larger space within the reservoir for accommodating the vapors. The upper limit of the diaphragm 12 is determined by the length of the chains 16 and when this is reached it will be noted that substantially the entire space within the tank 10 provides a reservoir for the vapors. The upper portion of the tank is equipped with a vent 21 leading to the atmosphere and which facilitates the upward movement of the diaphragm 12. In the event the vapor pressure reaches a predetermined maximum, the pressure and vacuum relief valve 22, located on the supply line 11, will exhaust to the atmosphere.

The lower diaphragm 13 moves upwardly when a vacuum condition exists within the vapor space of the storage tanks. Movement of this diaphragm is in all respects similar to that of diaphragm 12 and when the same has reached its upper limit of travel, determined by the chains 16, the space within the reservoir will have been reduced to a minimum. Of course, if the vacuum should increase in intensity after the lower diaphragm has reached its upper position air will be drawn in to relieve the same through the vacuum relief valve 22.

In Figures 3, 4, 5 and 6 the breather reservoir is characterized by a substantially elliptical tank 30 having a single diaphragm positioned within the same. The tank is positioned so that its cylindrical portion is horizontal and has connection with the supply line on the underside of the tank in the vicinity of its mid-section. As described in connection with Figures 1 and 2, the supply line will deliver to said reservoir the vapors from one or more storage tanks for gasoline or other volatile liquid. The diaphragm 32 of the flexible gas impervious material is suitably secured around its periphery as at 33 to the interior wall of the tank 30. The bar 35 carried by the diaphragm has a position substantially centrally of the transverse width of the same and said bar extends longitudinally, as will be clear from Figure 3. The bar 35 in this modification performs substantially the same function as the ring 15 in the structures of Figures 1 and 2 in that the chains 36 are anchored thereto and therefore said chains and the bar determine the inflated and deflated positions of the diaphragm. The said chains 36, which have their other end suitably fastened at 38 to the tank 10, apply to said diaphragm a gradually increasing weight as the diaphragm moves in an upward direction.

It will be evident from the above that the tank 30 is divided into two compartments or chambers by the diaphragm 32 and that the lower chamber is in communication with the vapor supply line 31. As the diaphragm moves upwardly a gradually increasing space for accommodating the vapors is provided by the reservoir and to facilitate this movement the upper chamber is provided with the vent 41 leading to the atmosphere. Also in this modification the supply line 31 is provided with a pressure and vacuum relief valve 42 which will function to exhaust the vapors to the atmosphere in order to relieve an excessive pressure within the breather reservoir and to draw in air if a vacuum should exceed a predetermined maximum. Figure 5 illustrates the full inflated position of the diaphragm wherein it will be observed that substantially the entire space within the tank is available for accommodating the vapors under pressure.

In Figure 6 the vapor line 31 and the vent 41 on the tank 30 are reversed in position with respect to Figure 3. This change adapts the tank for operating on vacuum. When atmospheric conditions prevail within the reservoir, or in the event the vapors within are under pressure the diaphragm will assume its lowest position as shown in Figure 6. As the vapors are withdrawn and the pressure becomes sub-atmospheric the diaphragm will rise. Accordingly a breather reservoir of maximum capacity for the size of the tank is provided for taking care of vacuum conditions which may exist in gasoline storage tanks and the like. When a breather reservoir of the type such as shown in Figures 3, 4 and 5 is coupled with a breather reservoir of the vacuum type, as outlined in connection with Figure 6, a complete unit is provided for connection with the vapor space of storage tanks such as described. When the vapors are under pressure, as often occurs during the heat of the day, the pressure reservoir of the unit will operate providing a gradually increasing space within its tank to care for the increase in pressure. On the other hand, in the event the pressure of the vapor spaces within the gasoline storage tanks drops below atmospheric the vacuum breather reservoir will be called into operation.

In the modified form of the invention shown in Figure 7, as applied to a single acting breather reservoir, a loading ring 58 is employed to make certain that the diaphragm will assume a horizontal position before passing through the restricted opening provided by the securing ring to which the fabric of the diaphragm is attached. The tank 43 is cylindrical in shape, having a manhole opening 44 at the top thereof and a similar man-hole 45 in the side wall adjacent the base 46. Within the tank a single diaphragm 47 is located, being suitably secured to the inside periphery of the tank by means of the securing ring which is shown in detail in Figure 9. Said structure essentially consists of an annular angle member 50 having suitably secured thereto by screws 51 an annular facing member 52. Below said member and welded to the interior surface of the tank there is located a depending part 53 to which chains are secured, as will be presently described. The terminal portion of the fabric 54 comprising the flexible diaphragm is suitably interposed between the part 53 and the facing member 52. Since all the elements forming the securing ring are drawn up tight by the screws 51 the terminal portion of the fabric is securely held in a manner to form a seal with the tank. The securing ring also spaces the fabric of the diaphragm from the walls of the housing and this prevents contact of the fabric with said walls. Since moisture forms on the interior walls of the housing freezing of the fabric to the walls during cold weather might occur if it were not for the fact that the securing ring maintains the fabric in spaced relation with respect to the walls of the housing at all times. Obviously, such freezing would render the reservoir inoperative. It is extremely important in the successful operation of the present breather that the diaphragm have freedom of movement within its housing.

The central part of the diaphragm carries the ring 55 of metal or the like which aids in the control of the diaphragm during its up and down movement in addition to providing an anchorage for one end of the loading chains 56 which are fixed at their other end to the part 53 of the securing ring. A second chain 57 is secured to each chain 56 approximately centrally thereof and said chains 57 are in turn fastened at their lower end to the loading ring 58. Said ring may be built up of angle pieces and a connecting center portion or in any other desired manner, the only requirement for the ring being that the same have a loose fit, permitting free slidable movement within the bottom portion of tank 43.

In operation of the improved structure above described it will be assumed that vapors are admitted to the tank through the conduit 60. As the pressure within the tank increases the center portion of the diaphragm, that is, the portion within the metal ring 55, will assume a dome shape. Eventually the diaphragm will be caused to travel upwardly until the metal ring reaches an intermediate position as shown in dotted lines in Figure 7. Free movement of the metal ring is permitted up to this point which locates the ring relatively close to the securing ring 49. Further movement can only take place by lifting of the loading ring 58 but this will not occur until the center portion of the diaphragm defined by the metal ring 55, is horizontally disposed. In other words, the lower part of the chains 56 will become taut and said parts along with chains 57 will have substantially the same tension applied thereto.

If the supply of vapors to the tank 43 continues the diaphragm will move upwardly and will lift the loading ring 58. As a result the center of the diaphragm including the metal ring 55 will pass through the restricted opening in perfect horizontal position. Chains 56 have a length so as to relieve the fabric of any direct tension when the diaphragm has reached its maximum movement in an upward direction. Accordingly, the only tension placed on the diaphragm tending to pull the terminal end of the fabric from the securing ring is the pressure of the vapors which tend to bulge the side walls of the diaphragm. The length of chains 57 is also an important factor in the successful operation of this improved breather reservoir. With the diaphragm in full expanded position tension is placed on the chains 56 and accordingly chains 57 have a length so as to position the loading ring 58 just below the part 53 of the securing ring.

In Figure 8 the improvements including the loading ring for the flexible diaphragm shown in Figure 7 have been applied to a double-acting breather reservoir. The steel sheel 70 comprising the housing for the reservoir has a vapor supply line 71 connecting therewith in the vicinity of its mid-section and vapors from one or more storage tanks are delivered to the breather reservoir through said supply line and conducted therefrom. Within the tank 70 there is provided an upper diaphragm 72 and a lower diaphragm 73, each diaphragm consisting of flexible gas impervious material and being suitably secured to the securing ring 74 in a manner as previously described. The central part of each diaphragm carries a metal ring 75 which aids in the control of the diaphragm during its up and down movement in addition to providing an anchor for one end of the loading chains 76 which are fastened at their other ends to the securing means. The central portion of each diaphragm, that is, the portion confined within its respective ring 75 assumes a dome position which is directed downwardly when the diaphragm is deflated and upwardly upon inflation thereof.

The improvement residing in the use of a loading ring 78 is applied to each diapraghm of the breather reservoir 70. As explained in connection with Figure 7 the loading ring is secured by chains 77 which in turn are fastened to the chains 76 respectively and at the approximate center thereof. The loading rings have a loose fit within the tank and therefore will have free slidable movement in a vertical direction within the tank. The lower ring 78 is suitably supported by the concrete foundation 79 of the breather reservoir when its diaphragm is in deflated position, whereas, the upper loading ring is suitably supported on the rods 80 extending transversely of the tank.

In the operation of the breather reservoir of Figure 8 the upper diaphragm 72 will move upwardly when vapors under pressure are supplied to the reservoir. When vacuum conditions exist the lower diaphragm 73 will move upwardly. The function of the loading ring is to cause its respective diaphragm including the metal ring 75 thereof to assume a horizontal position before passing through the restricted opening provided by the securing ring, and from thereon the loading ring will also maintain this central part of its diaphragm in horizontal position. In this respect the operation is identical with that as described in connection with the single acting breather reservoir of Figure 7.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a breather reservoir, in combination, a housing having connection with a supply line for delivering to or conducting therefrom a gaseous medium, a flexible diaphragm of gas impervious material within said housing forming with the walls thereof a chamber of variable capacity and which is in communication with said supply line, a metal ring carried by said diaphragm to aid in controlling the same during movement, a plurality of chains connecting with said metal ring at one end thereof and with the housing at their other end for supporting the diaphragm in deflated position, and a loading ring adapted to have movement vertically within the housing, said loading ring having connection with said chains.

2. In a breather reservoir, in combination, a housing having connection with a supply line for delivering to or conducting therefrom a gaseous medium, a flexible diaphragm of gas impervious material within said housing forming with the walls thereof a chamber of variable capacity and which is in communication with said supply line, a metal ring carried by said diaphragm to aid in controlling the same during movement, a plurality of chains connecting with said metal ring at one end and with the housing at their other end, said chains supporting the diaphragm in deflated position and also applying a gradually increasing weight to said diaphragm during movement thereof in an upward direction, and a loading ring located within said chamber and having connection with said chains approximately centrally of their length.

3. In a breather reservoir, a housing having connection with a supply line for delivering vapors thereto and conducting the vapors therefrom, a movable member within said housing adapted to have movement vertically thereof, annular sealing means of flexible material connecting said member to the walls of said housing, whereby said member, sealing means and housing form a chamber of variable capacity having communication with the supply line, and flexible loading members each connecting with said movable member at one end and with the housing at their other end for supporting the movable member in down position, said flexible loading members applying a gradually increasing weight to the movable member as the same moves upward and said loading members also limiting the upward movement of the movable member.

4. In a breather reservoir for vapors and the like, a housing connecting with a vapor supply line, a diaphragm of flexible, gas impervious material within said housing having a gas-tight connection around its periphery with the walls thereof, said diaphragm forming with the housing a chamber of variable capacity and which communicates with the supply line, a plurality of chains supporting said diaphragm in deflated position and which also limit movement of the diaphragm in an upward direction, said diaphragm including a member positioned substantially centrally thereof to which one end of the chains are secured, and means attaching the other end of the chains to the housing at a point below the connection of the diaphragm thereto.

5. In a breather reservoir for vapors and the like, a housing connecting a vapor supply line, a diaphragm of flexible, gas impervious material within said housing having a gas-tight connection around its periphery with the walls thereof, said diaphragm including a member positioned substantially centrally thereof and which adds weight to the diaphragm requiring a gradually increasing pressure to move the diaphragm to a fully inflated position, a plurality of flexible means supporting the diaphragm in deflated position and which limit movement of the diaphragm beyond said fully inflated position, one end of said flexible means having connection with the member and the other end of said means connecting with the housing at a point below the connection of the diaphragm thereto, said flexible means being located exteriorly of the diaphragm when fully deflated but having a position interiorly of the diaphragm when fully inflated.

6. In a breather reservoir for vapors and the like, a housing connecting with a vapor supply line, a diaphragm of flexible, gas impervious material within said housing having a gas-tight connection around its periphery with the walls thereof, said diaphragm forming with the housing a chamber of variable capacity and which communicates with the supply line, said diaphragm including a member positioned substantially centrally thereof, a plurality of chains connecting with said member at one end and having connection with the housing at their other end, said chains supporting the diaphragm in deflated position and also limiting movement of the diaphragm in a direction upwardly, and said chains being constructed and arranged to relieve the diaphragm of substantially all tension and strain which would otherwise be placed thereon in both deflated and inflated positions.

7. In a breather reservoir for vapors and the like, a housing connecting with a vapor supply line, a diaphragm of flexible, gas impervious material within said housing having a gas-tight connection around its periphery with the walls thereof, said diaphragm forming with the housing a chamber of variable capacity and which communicates with the supply line, a ring secured to the diaphragm substantially centrally thereof, a plurality of chains connecting with said ring at one end and having connection with the housing at their other end, said chains supporting the diaphragm in deflated position and also limiting movement of the same in a direction upwardly, the portion of the diaphragm within the ring flexing from a concave shape when deflated to a dome shape when inflated, and said diaphragm also assuming a reverse position with respect to the chains when fully inflated.

8. In a breather reservoir for vapors and the like, a housing connecting with a vapor supply line, a diaphragm of flexible, gas impervious material within said housing having a gas-tight connection around its periphery with the walls thereof, said diaphragm forming with the housing a chamber of variable capacity and which communicates with the supply line, a ring secured to the diaphragm substantially centrally thereof, a plurality of chains connecting with said ring at one end and having connection with the housing at their other end, said chains supporting the diaphragm in deflated position and also limiting movement of the same in a direction upwardly, the portion of the diaphragm within the ring flexing from a concave shape when deflated to a dome shape when inflated, and said chains applying a gradually increasing weight to the diaphragm as the same moves upwardly to an inflated position to also aid in maintaining the ring substantially horizontal during said movement.

9. In a breather reservoir for vapors and the like, a housing connecting with a vapor supply line, a diaphragm of flexible gas impervious material within said housing, means connecting the diaphragm around its periphery to the housing whereby a chamber of variable capacity is provided having communication with the supply line, said connecting means including a securing ring spaced from the interior wall of the housing, and means attaching the fabric of the diaphragm to said securing ring, whereby the diaphragm is maintained in spaced relation with the walls of the housing to prevent contact with said walls, and flexible means supporting the diaphragm in deflated position, said flexible means having connection with the diaphragm at one end and at their other end having connection with the housing at a point below the securing ring.

10. In a breather reservoir for vapors and the like, a housing connecting with a vapor supply line, a diaphragm of flexible gas impervious material within said housing, means connecting the diaphragm around its periphery to the housing whereby a chamber of variable capacity is provided having communication with the supply line, said connecting means including a securing ring spaced from the interior wall of the housing, and means attaching the fabric of the diaphragm to said securing ring, whereby the diaphragm is maintained in spaced relation with the walls of the housing to prevent contact with said walls, and a plurality of chains supporting the diaphragm in deflated position, said chains connecting with the diaphragm at one end and at their other end having connection with the housing at a point below the securing ring.

11. In a breather reservoir for vapors and the like, a housing connecting with a vapor supply line, a diaphragm of flexible, gas impervious material within said housing, means connecting the diaphragm around its periphery to the housing whereby a chamber of variable capacity is provided having communication with the supply line, said connecting means including a securing ring spaced from the interior wall of the housing, and means attaching the fabric of the diaphragm to said securing ring, whereby the diaphragm is maintained in spaced relation with the walls of the housing to prevent contact with said walls, an annular member of smaller diameter than the securing ring having attachment to the diaphragm substantially centrally thereof, a plurality of chains connecting with said annular member at one end and having connection with the housing at their other end at a point below the securing ring, said chains supporting the diaphragm in deflated position and also limiting movement of the diaphragm in a direction upwardly, and said chains applying a gradually increasing weight to the annular member as the same moves upwardly and which is uniformly distributed around the member when horizontally positioned, whereby said chains function to maintain the annular member substantially horizontal during vertical movement thereof.

CLIFFORD A. ELLIS.